United States Patent
Tobinaga (10) Patent No.: US 10,289,367 B2
(45) Date of Patent: May 14, 2019

(54) IMAGE FORMING APPARATUS

(71) Applicant: KYOCERA Document Solutions Inc., Osaka (JP)

(72) Inventor: Masayuki Tobinaga, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/559,242

(22) PCT Filed: Mar. 29, 2016

(86) PCT No.: PCT/JP2016/060161
§ 371 (c)(1),
(2) Date: Sep. 18, 2017

(87) PCT Pub. No.: WO2016/181716
PCT Pub. Date: Nov. 17, 2016

(65) Prior Publication Data
US 2018/0081609 A1    Mar. 22, 2018

(30) Foreign Application Priority Data

May 8, 2015  (JP) ................................. 2015-095917

(51) Int. Cl.
*G06F 3/12*      (2006.01)
*H04N 1/00*     (2006.01)
(Continued)

(52) U.S. Cl.
CPC ............ *G06F 3/1256* (2013.01); *B41J 29/42* (2013.01); *G03G 15/5004* (2013.01);
(Continued)

(58) Field of Classification Search
CPC .......... H04N 1/00251; H04N 1/00267; H04N 1/00411; H04N 1/0044; H04N 2201/0094;
(Continued)

(56) References Cited

U.S. PATENT DOCUMENTS 6,171,742 B1 *  1/2001  Kawada ............. G03G 5/08285
                                                      430/66
7,533,995 B2   5/2009  Momiuchi et al.
(Continued)

FOREIGN PATENT DOCUMENTS

JP    2003-233339 A    8/2003
JP    2007-206588 A    8/2007
(Continued)

*Primary Examiner* — Negussie Worku
(74) *Attorney, Agent, or Firm* — IP Business Solutions, LLC (57) ABSTRACT

An image forming apparatus (1) includes a visible image forming unit (50), a display control unit (101) that causes the visible image forming unit (50) to form a visible image representing a display screen containing an image to be formed, an operation detection unit (54), a reception unit (104), and an image processing unit (105). The operation detection unit (54) detects a user's operation performed in the air, on the display screen displayed as the visible image by the visible image forming unit (50). The reception unit (104) identifies, when the user's operation detected by the operation detection unit (54) is a predetermined user's operation, a gradient to be applied to the image to be formed, according to the predetermined user's operation. The image processing unit (105) performs a perspective processing with respect to the image to be formed, according to the gradient identified by the reception unit (104).

6 Claims, 7 Drawing Sheets (51) Int. Cl.
  *G03G 15/00* (2006.01)
  *G09G 5/00* (2006.01)
  *B41J 29/42* (2006.01)
  *G06F 3/0484* (2013.01)

(52) U.S. Cl.
  CPC .......... *G06F 3/0484* (2013.01); *G06F 3/1205* (2013.01); *G06F 3/1258* (2013.01); *G06F 3/1285* (2013.01); *G09G 5/003* (2013.01); *H04N 1/00* (2013.01); *H04N 1/00493* (2013.01); *H04N 1/00962* (2013.01)

(58) Field of Classification Search
  CPC .. H04N 1/00; H04N 1/00493; H04N 1/00962; H04N 1/04; B41J 29/42; G03G 15/5004; G06F 3/0484; G06F 3/1205; G06F 3/1256; G06F 3/1285; G09G 5/003
  See application file for complete search history.

(56) References Cited

U.S. PATENT DOCUMENTS

| | | | |
|---|---|---|---|
| 7,766,485 B2 | 8/2010 | Momiuchi et al. | |
| 8,861,022 B2* | 10/2014 | Hashimoto | G06K 15/005 358/1.15 |
| 9,485,372 B2* | 11/2016 | Tobinaga | H04N 1/0044 |
| 2004/0135741 A1* | 7/2004 | Tomisawa | H04N 13/398 345/6 |
| 2005/0068999 A1* | 3/2005 | Momiuchi | G09F 19/18 372/24 |
| 2009/0213340 A1 | 8/2009 | Momiuchi et al. | |
| 2011/0235107 A1* | 9/2011 | Sakata | H04N 1/0035 358/1.15 |
| 2012/0069055 A1* | 3/2012 | Otsuki | G06F 3/017 345/681 |
| 2015/0347062 A1* | 12/2015 | Tobinaga | G06F 3/1204 358/1.15 |
| 2016/0182761 A1* | 6/2016 | Tobinaga | H04N 1/4413 358/1.14 |
| 2016/0259298 A1* | 9/2016 | Farringdon | G02B 27/2292 |
| 2016/0295031 A1* | 10/2016 | Tobinaga | H04N 1/0044 |
| 2018/0087609 A1* | 3/2018 | Horen | F16H 3/66 |

FOREIGN PATENT DOCUMENTS

| | | |
|---|---|---|
| JP | 2010-078623 A | 4/2010 |
| JP | 2013-127625 A | 6/2013 |

* cited by examiner

IMAGE FORMING APPARATUS

TECHNICAL FIELD

The present invention relates to an image forming apparatus, and more particularly to a technique of displaying a screen presenting contents of an image to be formed.

BACKGROUND ART

Normally, image forming apparatuses include a display unit, for example a liquid crystal display (LCD) and an organic light-emitting diode (OLED) display. Such an image forming apparatus displays a screen presenting a preview of the image to be formed (what is known as a preview screen) in the display unit, for the user to confirm the contents of the image to be formed. Then the image forming apparatus receives an instruction of the user for processing the preview of the image to be formed through, for example, a touch panel function provided in the display unit, to thereby print the image processed by the user (image forming).

CITATION LIST

Patent Literature

[PTL 1] Japanese Unexamined Patent Application Publication No. 2003-233339
[PTL 2] Japanese Unexamined Patent Application Publication No. 2007-206588
[PTL 3] Japanese Unexamined Patent Application Publication No. 2010-78623
[PTL 4] Japanese Unexamined Patent Application Publication No. 2013-127625

SUMMARY OF INVENTION

Technical Problem

In recent years, visible image forming apparatuses that form a visible image in the air to display required information have been proposed. For example, PTL 1 and PTL 2 cited above disclose a visible image forming apparatus that intermittently emits an invisible laser beam, and generates plasma by collecting the laser beam with lenses and mirrors, to thereby form, in the air, the visible image representing characters and pictures on the basis of the visible light from the plasma thus generated. In addition, PTL 3 cited above discloses a visible image forming apparatus that forms a visible image in the space inside a vehicle, to display required information.

Further, a visible image forming apparatus according to PTL 4 cited above is configured to receive and reflect light from an object or a display device, and converge the reflected light at a symmetrical position of the object or display device with respect to an optical image forming device, to thereby form an object image in the air.

Now, the foregoing visible image forming apparatuses may be incorporated in an image forming apparatus, in place of popular display devices such as the LCD or the OLED display. In this case, a visible image representing a preview screen can be formed in the air.

However, simply forming the visible image representing a preview screen in the air merely allows the user to confirm the image to be formed displayed in the air, and hence the user is unable to process the image to be formed after confirming the same. Such a system lacks in user-friendliness, since the user is unable to process the image, even when the image to be formed displayed as above is unsatisfactory to the user.

The present invention has been accomplished in view of the foregoing situation, and provides a technique to allow the user, not only to confirm the image to be formed in the air, but also to process the image to be formed upon confirming the same.

Solution to Problem

In an aspect, the present invention provides an image forming apparatus including a visible image forming unit, a display control unit, an operation detection unit, a reception unit, and an image processing unit.

The visible image forming unit forms a visible image in air.

The display control unit controls an operation of the visible image forming unit, so as to cause the visible image forming unit to form a visible image representing a display screen containing a preview of an image to be formed.

The operation detection unit detects a user's operation performed in the air, on the display screen displayed as the visible image by the visible image forming unit.

The reception unit receives the user's operation detected by the operation detection unit. The image processing unit performs an image processing with respect to the image to be formed.

The reception unit identifies, when the user's operation detected by the operation detection unit is a predetermined user's operation, a gradient to be applied to the image to be formed, according to the predetermined user's operation.

The image processing unit performs a perspective processing with respect to the image to be formed, according to the gradient identified by the reception unit.

Advantageous Effects of Invention

The image forming apparatus configured as above allows the user, not only to confirm the image to be formed in the air, but also to perform the perspective processing with respect to the image to be formed upon confirming the same.

DESCRIPTION OF EMBODIMENTS

Figure 1:
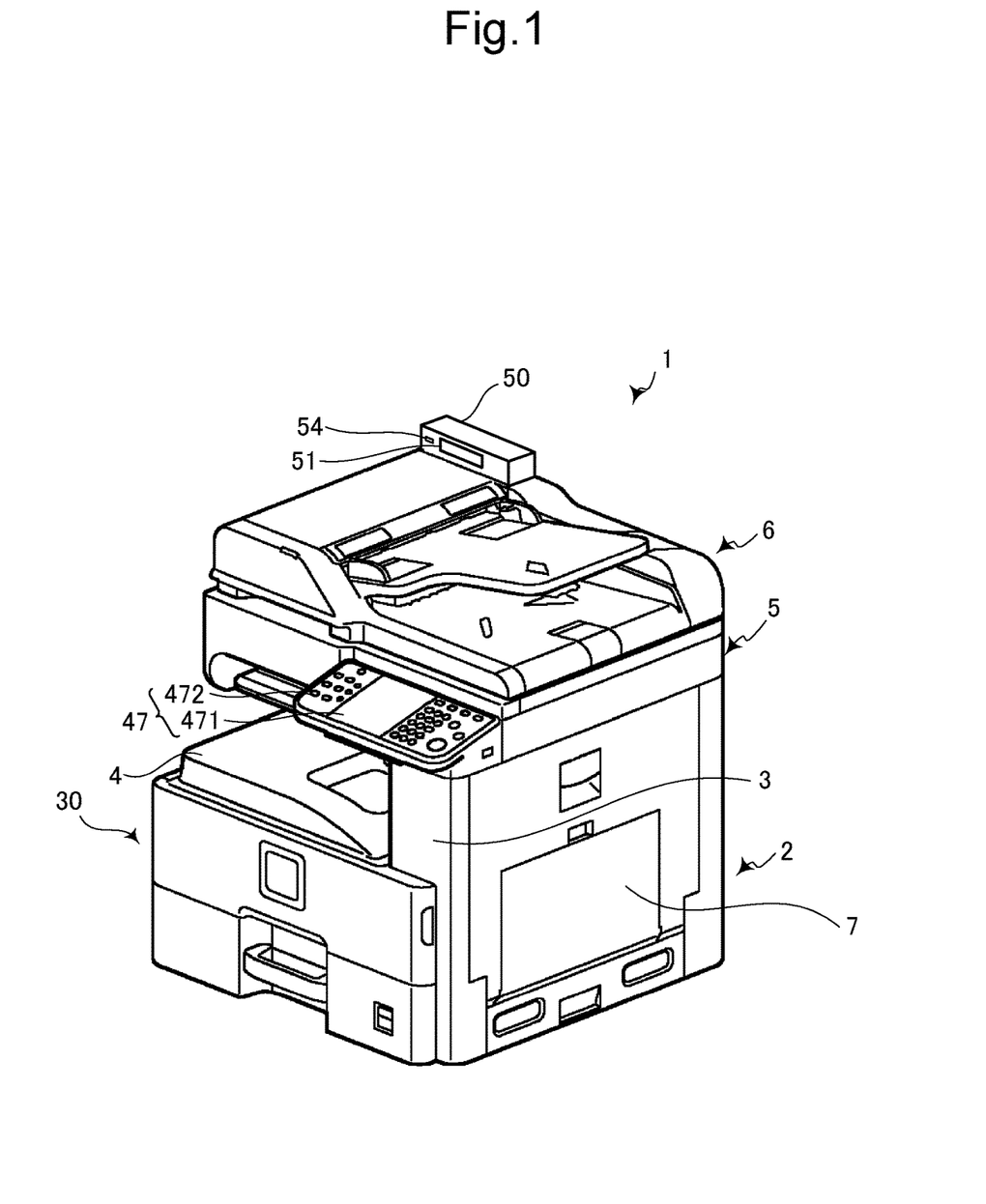
FIG. 1 is a perspective view showing an appearance of an image forming apparatus according to an embodiment of the present invention.
Figure 2:
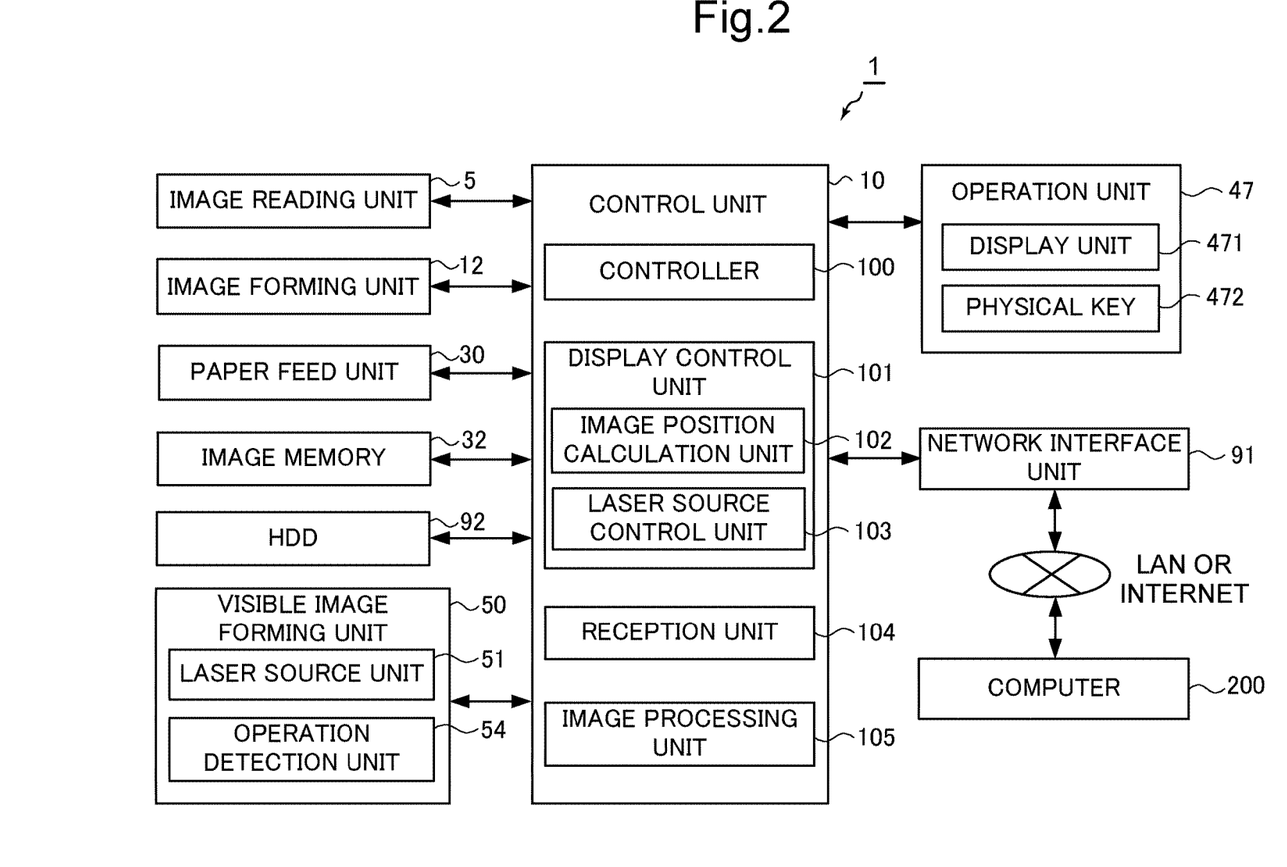
FIG. 2 is a functional block diagram showing an essential internal configuration of the image forming apparatus according to the embodiment of the present invention.

Hereafter, a configuration of an image forming apparatus, exemplifying the information processing apparatus according to an embodiment of the present invention, will be described. FIG. 1 is a perspective view showing an appearance of the image forming apparatus. FIG. 2 is a functional block diagram showing an essential internal configuration of the image forming apparatus.

The image forming apparatus 1 is a multifunction peripheral having a plurality of functions, such as facsimile transmission, copying, printing, and scanning. As shown in FIG. 1, the image forming apparatus 1 includes a main body 2, an image reading unit 5 located above the main body 2, and a joint portion 3 provided between the image reading unit 5 and the main body 2.

The casing 7 constituting the outer shell of the image forming apparatus 1 accommodates therein a plurality of components that serve to realize various functions of the image forming apparatus 1. Out of the components shown in FIG. 2, the image reading unit 5, an image forming unit 12, a paper feed unit 30, an image memory 32, a network interface unit 91, a hard disk drive (HDD) 92, and a control unit 10 are provided inside the casing 7.

The image reading unit 5 includes a document feeder 6, and optically reads a source document transported from the document feeder 6 or placed on a non-illustrated contact glass. The image reading unit 5 reads the source documents one by one, thereby acquiring image data representing an image to be formed.

The paper feed unit 30 includes a non-illustrated paper feed cassette and a pickup roller, and feeds the recording sheets placed in the paper feed cassette with the pickup roller, toward the image forming unit 12 one by one.

The image forming unit 12 includes non-illustrated photoconductor drums, charging units, exposure units, developing units, and a transfer unit, and forms (prints) images on the recording sheet delivered from the paper feed unit 30, on the basis of the image read by the image reading unit 5 or print data transmitted from, for example, a personal computer connected to a network. The recording sheet having the image formed thereon undergoes a fixing process performed by a non-illustrated fixing unit, and is discharged to an output tray 4.

The image memory 32 is a region for temporarily storing the image data acquired through the document reading performed by the image reading unit 5, and image data to be formed into an image by the image forming unit 12.

The network interface unit 91 includes a communication module such as a LAN board. The network interface unit 91 transmits and receives data to and from a computer 200 or other devices in the local area, through the LAN connected to the network interface unit 91.

The HDD 92 is a large-capacity storage device for storing, for example, the image data acquired through the document reading performed by the image reading unit 5.

The control unit 10 includes a central processing unit (CPU), a random access memory (RAM), and a read only memory (ROM). The control unit 10 acts as controller 100, display control unit 101, reception unit 104, and image processing unit 105, when the CPU executes a control program stored in the ROM or HDD 92. The components of the control unit 10 may be respectively realized by hardware circuits, instead of the operation based on the control program.

The controller 100 is connected to the image reading unit 5, the image forming unit 12, the paper feed unit 30, the image memory 32, the network interface unit 91, and the HDD 92, to control those functional units and to transmit and receive data to and from those units. In particular, the controller 100 acts as image formation control unit that controls the image forming operation performed by the image forming unit 12.

The display control unit 101 is configured to control the operation of a display unit 471 and a visible image forming unit 50 to be subsequently described. The display control unit 101 includes an image position calculation unit 102 and a laser source controller 103 employed for controlling the operation of the visible image forming unit 50. Details of the image position calculation unit 102 and the laser source controller 103 will be subsequently described.

The reception unit 104 is configured to receive an operation of a user inputted through an operation unit 47 to be subsequently described, or detected by an operation detection unit 54 to be subsequently described.

The image processing unit 105 is configured to process the image to be formed.

The image forming apparatus 1 also includes the operation unit 47 including the display unit 471 (display) and physical keys 472, and located on the front face of the casing 7 constituting the outer shell of the image forming apparatus 1.

The display unit 471 is constituted of, for example, an LCD or OLED display, the display surface thereof being oriented upward. The display unit 471 is configured to display, on the display surface, an operation screen (display screen) related to image forming or document reading, under the control of the display control unit 101.

The physical keys 472 include, for example, arrow keys for moving the focus of a graphical user interface (GUI) constituting the operation screen, an enter key for confirming the operation to the GUI constituting the operation screen, and numeric keys. The physical keys 472 serve as operation unit for receiving the operation of the user performed with respect to the operation screen displayed on the display surface of the display unit 471.

The display unit 471 also includes a non-illustrated touch panel provided on the upper face of the display surface. The touch panel may be, for example, of a resistive film type or a static capacitance type. The touch panel detects a contact made by the user on the display surface of the display unit 471, as well as the position where the contact has been made. Upon detecting the contact by the user, the touch panel outputs a detection signal indicating the coordinate position of the contact point, to the reception unit 104. Here, the touch panel includes a type that detects, for example, the user's finger when the user's finger comes within a predetermined distance from the touch panel, though a direct touch to the display surface is not made. Accordingly, the term "contact" referred to in this embodiment will also include the case where the approach of the finger or the like to the predetermined distance from the touch panel is detected, though actually a direct touch to the display surface is not made.

Further, the visible image forming unit 50 is provided on the upper face of the casing 7 constituting the outer shell of the image forming apparatus 1.

The visible image forming unit 50 is configured to form a visible image in the air. (1) The visible image forming unit 50 may intermittently emit an invisible laser beam, and generate plasma by collecting the laser beam with lenses and mirrors, to thereby form the visible image representing characters and pictures in the air, on the basis of the visible light from the plasma thus generated. Such a visible image forming method can be found, for example, in JP-A-No. 2003-233339 and JP-A-No. 2007-206588. (2) Alternatively, the visible image forming unit 50 may include an optical image forming device, to receive and reflect light from a display device and converge the reflected light at a symmetrical position of the display device with respect to the optical image forming device, to thereby form an object image in the air. Such a visible image forming method can be found, for example, in JP-A-No. 2013-127625. In this embodiment, it will be assumed that the visible image forming unit 50 is configured as (1) above.

The visible image forming unit 50 includes a laser source unit 51 and the operation detection unit 54. The laser source unit 51 includes, though not shown, a laser source that emits a laser beam, lenses and mirrors that collect the laser beam from the laser source to thereby generate plasma, and a scanning mechanism for scanning over the laser source and the lenses and mirrors. The laser source unit 51 emits an invisible laser beam under the control of the display control unit 101. The laser source unit 51 then generates plasma by collecting the laser beam with lenses and mirrors, to thereby form, as visible image in the air, the operation screen containing characters and pictures, on the basis of the generated plasma.

The image position calculation unit 102 of the display control unit 101 calculates the emission direction and emission position of the laser beam from the laser source unit 51, so as to allow the visible image representing the operation screen to be formed at a predetermined visible image forming position (position on a predetermined three-dimensional coordinate system). In other words, the image position calculation unit 102 calculates the visible image forming position where the laser source unit 51 is to generate the plasma.

The laser source controller 103 of the display control unit 101 controls the laser source unit 51, so as to cause the air present in the emission direction and emission position of the laser beam calculated by the image position calculation unit 102 to perform plasma emission. The visible image is generated by luminescent spots that appear at the intersections of two laser beams, and therefore the laser source controller 103 controls the laser source unit 51 so as to adjust the timing to emit the two laser beams such that, for example, the positions of the luminescent spots correspond to the pixels constituting the image.

Figure 3:
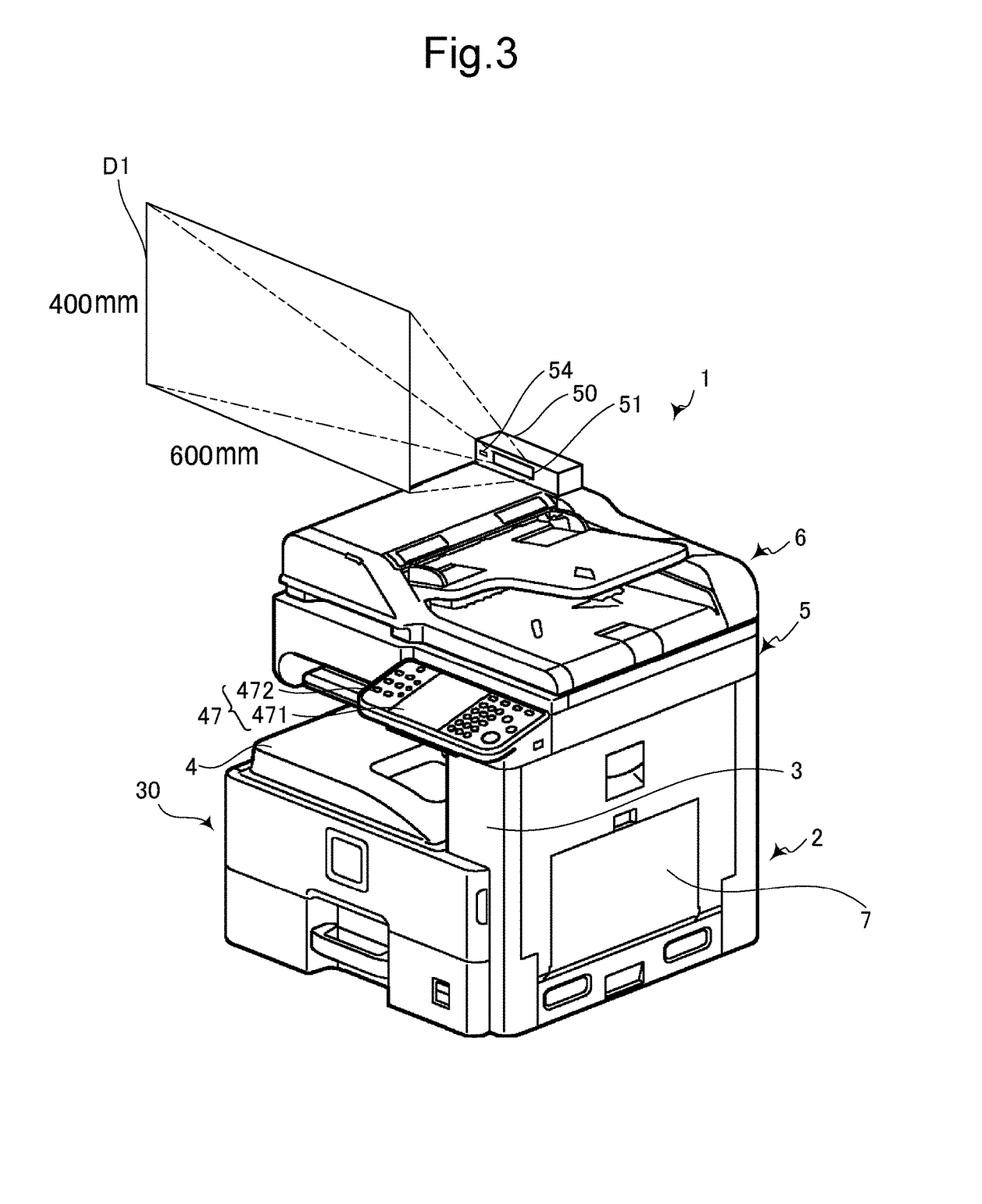
FIG. 3 is a perspective view showing a visible image formed by a visible image forming unit of the image forming apparatus according to the embodiment of the present invention.

Under such control of the display control unit 101, the visible image forming unit 50 forms a visible image D1 at a predetermined position in the air above the image forming apparatus 1, as shown in FIG. 3. The visible image D1 represents the operation screen (preview screen) containing the preview of the image to be formed by the image forming unit 12, in a size of, for example, 400 mm in height and 600 m in width.

Since the size of the display unit 471 is limited, it is difficult to transmit the information contained in the operation screen of the display unit 471 to a person located distant from the display unit 471. In addition, the display unit 471 having the touch panel function is normally oriented upward in many of the image forming apparatuses as shown in FIG. 3, which allows only a person right in front of the image forming apparatus 1 to recognize the information contained in the operation screen of the display unit 471.

With the image forming apparatus 1, however, the operation screen displayed by the display unit 471 can be formed in the air as visible image, and therefore the information contained in the operation screen can also be transmitted to persons located distant from the image forming apparatus 1.

Back to FIG. 1 and FIG. 2, the operation detection unit 54 is configured to detect, when a visible image representing the operation screen is formed by the visible image forming unit 50, an operation of pressing down the operation screen (press-down operation). More specifically, the operation detection unit 54 detects as press-down operation an action of placing the user's hand in a spatial position where the visible image representing the operation screen is formed, and moving the user's hand in a direction orthogonal to the operation screen, from the position where the user's hand has been initially placed. The operation detection unit 54 outputs, to the reception unit 104, a notice to the effect that the press-down operation with respect to the operation screen has been detected, and position information indicating the position where the press-down operation has been performed.

For example, the operation detection unit 54 includes, though not shown, an imaging unit including an imaging lens that forms an image from light from a subject, an image sensor that performs photoelectric conversion of the subject image formed by the imaging lens, and a circuit that drives the image sensor. The operation detection unit 54 is located in the vicinity of the laser source unit 51, and shoots a predetermined range in a three-dimensional space around a predetermined forming position where the visible image is formed by the laser beam emitted from the laser source unit 51.

The operation detection unit 54 identifies an image such as the user's hand and the spatial position of the image, on the basis of the image that has been shot. Then the operation detection unit 54 detects, when the spatial position of the image such as the user's hand is within the specified range (for example, within 10 mm in at least one of x, y, and z directions) from the operation screen formed as visible image in the predetermined forming position, that the press-down operation is being performed with respect to the operation screen formed as visible image, and acquires the position information indicating the position where the press-down operation is performed.

The operation detection unit 54 processes the image that has been shot, for example image thresholding and pattern matching based on shading information, to thereby identify the image such as the user's hand. In this embodiment, the operation detection unit 54 decides whether the image that has been shot contains the image of the user's hand, through pattern matching between the shot image and a reference image of the user's hand stored in advance in the HDD 92.

Further, the operation detection unit 54 decides whether the shape of the hand used for the press-down operation is a predetermined shape. Here, the predetermined shape refers to, for example, a shape of the hand with all five fingers stretched (shape of "paper" in the rock-paper-scissors game). The operation detection unit 54 decides whether the five fingers of the hand used for the press-down operation are stretched, through pattern matching between the shot image and a reference image of the hand with the five fingers stretched stored in advance in the HDD 92. Upon deciding that the shape of the hand used for the press-down operation is the hand with the five fingers stretched, the operation detection unit 54 outputs a notice to such effect to the reception unit 104.

The reception unit 104 receives the operation of the user detected by the operation detection unit 54 as described above. When the operation detection unit 54 outputs the notice to the effect that the press-down operation has been detected, and that the shape of the hand used for the press-down operation is not the hand with the five fingers stretched, the reception unit 104 receives a selection instruction with respect to the GUI of the operation screen formed at the position indicated by the position information.

In contrast, when the operation detection unit 54 outputs the notice to the effect that the press-down operation has been detected, and that the shape of the hand used for the press-down operation is the hand with the five fingers stretched, the reception unit 104 receives a perspective processing instruction with respect to the image to be formed contained in the operation screen. When the reception unit 104 receives the perspective processing instruction, the image processing unit 105 performs the perspective processing on the image to be formed, and causes the image forming unit 12 to form the image that has undergone the perspective processing. The detail of the perspective processing will be subsequently described.

Figure 4:
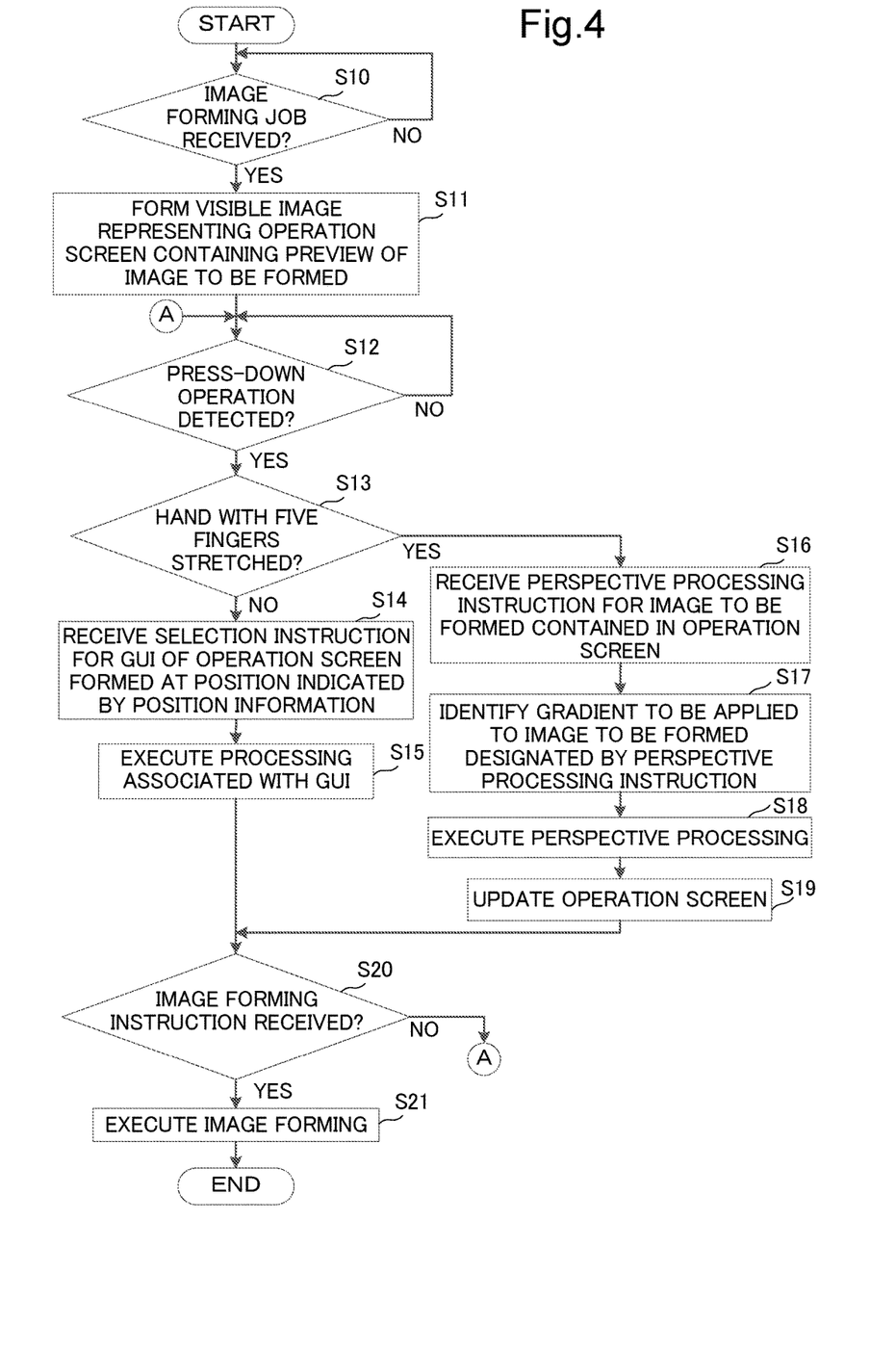
FIG. 4 is a flowchart showing an operation flow performed by the image forming apparatus according to the embodiment of the present invention.

Hereunder, a specific operation performed by the image forming apparatus 1 will be described. FIG. 4 is a flowchart showing the operation flow of the image forming apparatus 1.

When the reception unit 104 receives an image forming job transmitted from, for example, the computer 200 in the local area (YES at step S10), the display control unit 101 causes the visible image forming unit 50 to form the visible image representing the operation screen in the predetermined spatial position above the image forming apparatus 1 (step S11).

Figure 5A:
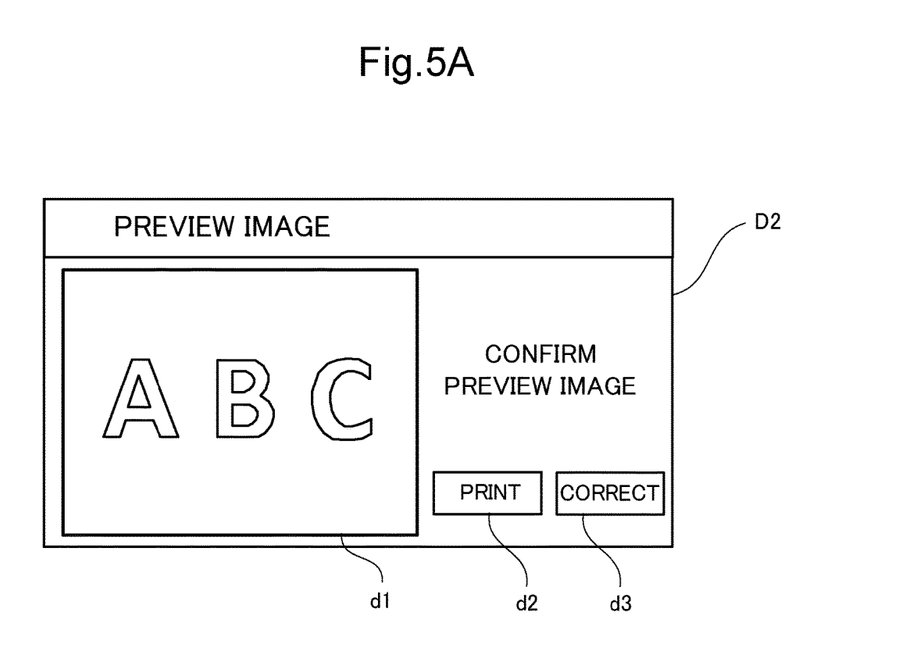
FIG. 5A is a front view of an operation screen formed as visible image by the visible image forming unit of the image forming apparatus according to the embodiment of the present invention.

FIG. 5A illustrates an operation screen D2 formed as visible image by the visible image forming unit 50. The operation screen D2 includes a preview image region d1 containing the preview of the image to be formed corresponding to the image forming job received by the reception unit 104 at step S10, a print instruction button d2, and a correction instruction button d3.

In the case where the operation detection unit 54 outputs the notice to the effect that the press-down operation with respect to the operation screen has been detected after the visible image forming of step S11 (YES at step S12), and that the shape of the hand used for the press-down operation is not the hand with the five fingers stretched, (NO at step S13), the reception unit 104 receives the selection instruction with respect to the GUI of the operation screen formed at the position indicated by the position information outputted from the operation detection unit 54 (step S14).

The controller 100 and the display control unit 101 then execute the process associated with the GUI selected according to the selection instruction received at step S14 (step S15). Referring to the example shown in FIG. 5A, when the reception unit 104 receives the selection instruction through the print instruction button d2, the controller 100 causes the image forming unit 12 to form the image displayed in the preview image region d1.

In contrast, in the case where the operation detection unit 54 outputs the notice to the effect that the press-down operation with respect to the operation screen has been detected after the visible image forming of step S11 (YES at step S12), and that the shape of the hand used for the press-down operation is the hand with the five fingers stretched (YES at step S13), the reception unit 104 receives the perspective processing instruction with respect to the image to be formed, contained in the operation screen (step S16).

Figure 5B:
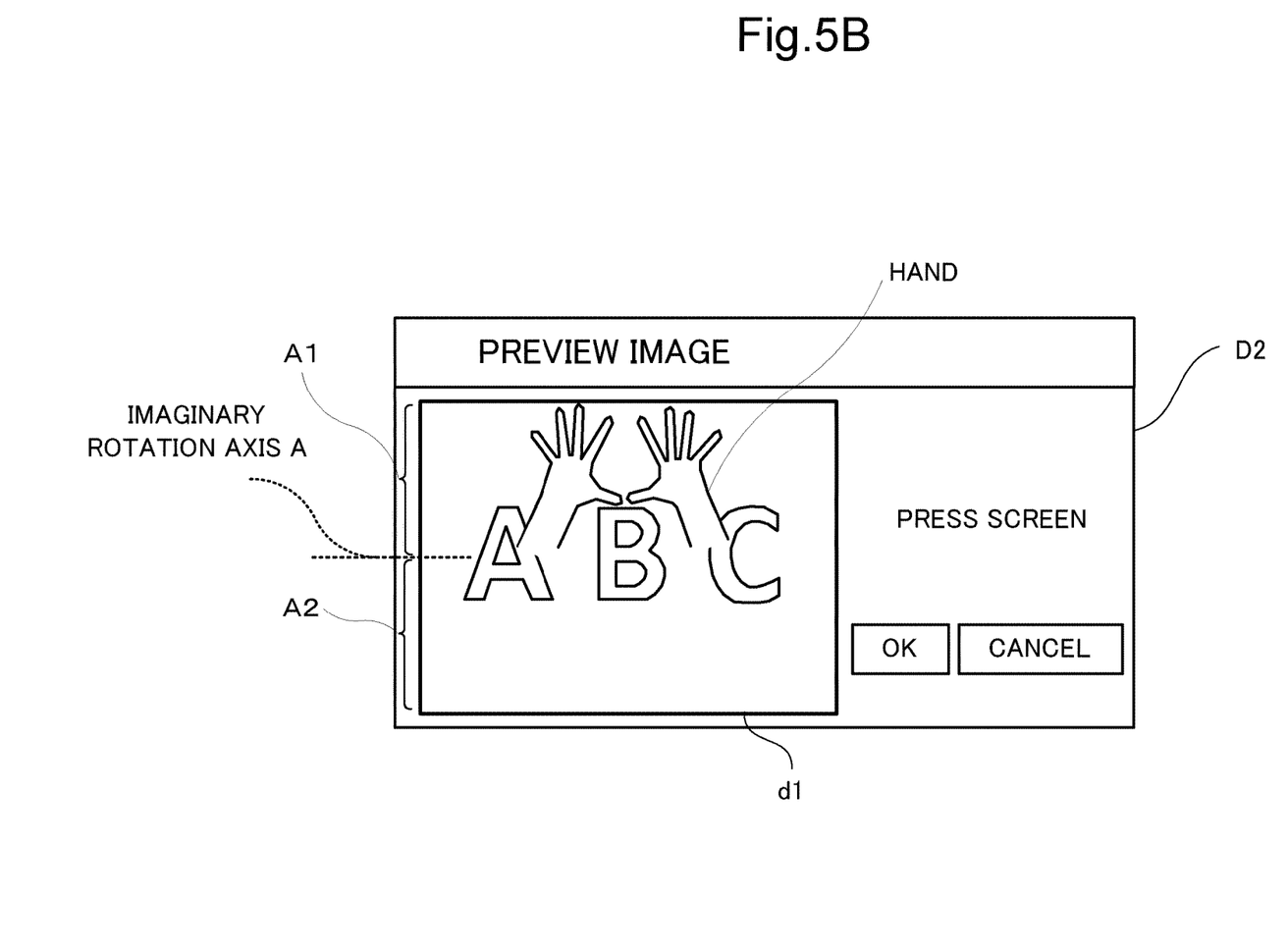
FIG. 5B is a front view of the operation screen showing a perspective processing instruction inputted by a user in the image forming apparatus according to the embodiment of the present invention.

FIG. 5B illustrates an example of the perspective processing instruction inputted by the user. When the user wishes to perform the perspective processing on the image to be formed, as result of confirming the visible image displayed in the air, the user presses down the spatial position in the operation screen D2 where the preview image region d1 is formed, with the hand with five fingers stretched. In the example shown in FIG. 5B, the spatial position in the operation screen D2 where the preview image region d1 is formed is pressed down with both of the left and right hands.

After step S16, the reception unit 104 identifies the gradient to be applied to the image to be formed, according to the perspective processing instruction (step S17).

Here, an imaginary rotation axis A is defined in the spatial position in the operation screen D2 where the preview image region d1 is formed. The coordinate information indicating the spatial position of the rotation axis A is stored in advance in the HDD 92. The reception unit 104 calculates the distance between the position where the preview image region d1 in the operation screen D2 has been pressed down and the rotation axis A, on the basis of the coordinate information stored in advance in the HDD 92 and the position information indicating the position where the press-down operation has been performed with the hand with five fingers stretched. Then the reception unit 104 calculates the gradient to be applied to the image to be formed displayed in the preview image region d1, on the basis of the distance calculated as above and a stroke of the press-down operation (distance in a depth direction of the sheet representing FIG. 5B) performed in the preview image region d1 in the operation screen D2. More specifically, the reception unit 104 increases the gradient to be applied to the image to be formed, the longer the press-down stroke of the preview image region d1 is, and the shorter the distance between the press-down position and the rotation axis A is.

After step S17, the image processing unit 105 performs the perspective processing with respect to the image to be formed displayed in the preview image region d1 (step S18). More specifically, the image processing unit 105 determines processing intensity to be adopted in the perspective processing, on the basis of the gradient to be applied to the image to be formed, identified by the reception unit 105. A table representing cross-reference between the gradient of the image to be formed and the processing intensity is stored in advance in the HDD 92, so that the image processing unit 105 looks up the table to determine the processing intensity to be adopted in the perspective processing. The image processing unit 105 performs the perspective processing on the image to be formed, with the processing intensity thus determined. The image that has undergone the perspective processing is stored in the HDD 92.

Figure 5C:
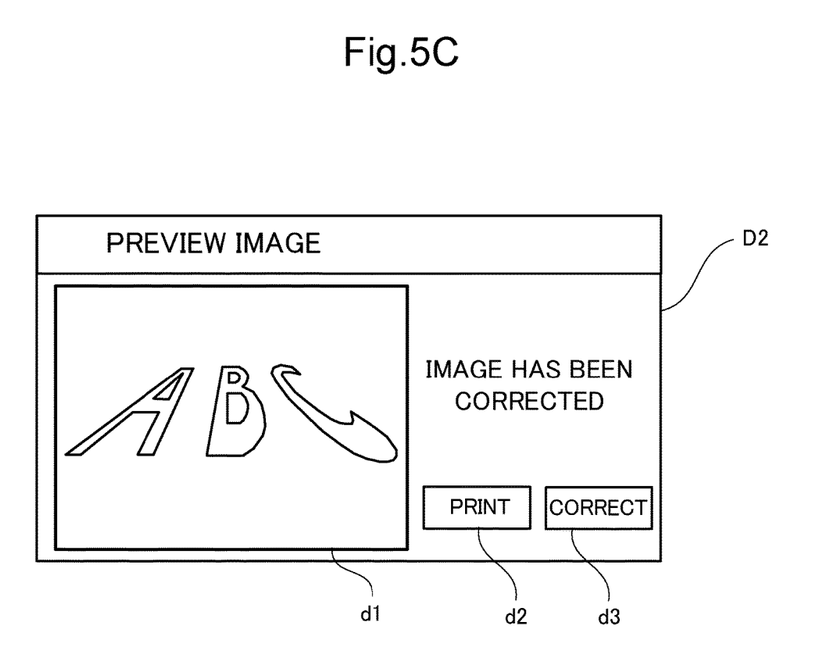
FIG. 5C is a front view of the operation screen showing the image subjected to the perspective processing according to the perspective processing instruction shown in FIG. 5B, in the image forming apparatus according to the embodiment of the present invention.

After step S18, the display control unit 101 causes the visible image forming unit 50 to update the visible image representing the operation screen (step S19). In this embodiment, the display control unit 101 causes the visible image forming unit 50 to form the visible image representing the operation screen containing the image that has undergone the perspective processing performed at step S19 (see FIG. 5C).

When the reception unit 104 receives the image forming instruction after step S15 or step S19 (YES at step S20), the controller 100 causes the image forming unit 12 to form the image determined as the image to be formed, through the foregoing steps (step S21).

The present invention is not limited to the foregoing embodiment, but may be modified in various manners.

Although the shape of the hand with five fingers stretched is adopted as the predetermined shape to be decided by the operation detection unit 54 in the foregoing embodiment, the present invention is not limited to such a setting. The operation detection unit 54 may decide a different shape of the hand as the predetermined shape, instead of the hand with five fingers stretched. For example, the operation detection unit 54 may decide a shape of the hand with one of the five finger stretched, as the predetermined shape.

The invention claimed is:

1. An image forming apparatus comprising:
a visible image forming unit that includes: a laser source unit including a laser source that emits a laser beam, an optical system that collects the laser beam from the laser source to thereby generate plasma, and a scanning mechanism that scans over the laser source and the optical system, the laser source unit forming a visible image in air; and an operation detection unit including an imaging unit including an imaging lens that forms an image from light from a subject, an image sensor that performs photoelectric conversion of the subject image formed by the imaging lens, and a circuit that drives the image sensor, the operation detection unit detecting a user's operation performed in the air, on the display screen displayed as the visible image by the visible image forming unit; and
a control unit that includes a processor and acts, when the processor executes a control program, as:
a display control unit that controls an operation of the visible image forming unit, so as to cause the visible image forming unit to form a visible image representing a display screen containing a preview of an image to be formed;
a reception unit that receives the user's operation detected by the operation detection unit; and
an image processing unit that performs an image processing with respect to the image to be formed,
wherein the reception unit possesses position information stored therein in advance and indicating a position of an imaginary rotation axis provided in a spatial position where the visible image is formed, and identifies, when the user's operation detected by the operation detection unit is a predetermined user's operation, a gradient to be applied to the image to be formed, on a basis of a distance between a position where a hand has contacted the display screen in the predetermined user's operation and the rotation axis, and on a basis of a distance by which the hand has moved in a direction orthogonal to the display screen, and
the image processing unit performs a perspective processing with respect to the image to be formed, according to the gradient identified by the reception unit.

2. The image forming apparatus according to claim 1, wherein the operation detection unit decides whether a shape of a hand used for the user's operation is a predetermined shape, and detects, as the predetermined user's operation, an action of moving the hand of the predetermined shape from a spatial position where the visible image representing the display screen is formed, in a direction orthogonal to the display screen.

3. The image forming apparatus according to claim 2, wherein the operation detection unit detects, when the shape of the hand used for the user's operation is not the predetermined shape, the action of moving the hand from the spatial position where the visible image representing the display screen is formed, in the direction orthogonal to the display screen, as a selection operation with respect to a GUI constituting the display screen.

4. The image forming apparatus according to claim 2, wherein the operation detection unit includes an imaging unit that picks up an image of the hand used for the user's operation, and decides whether the shape of the hand used for the user's operation is the predetermined shape, by pattern matching between the image of the hand shot by the imaging unit and a reference image stored in advance.

5. The image forming apparatus according to claim 1, wherein the display control unit causes the visible image forming unit to update the display screen displayed as the visible image to a display screen containing an image that has undergone the perspective processing performed by the image formation control unit, when the user's operation detected by the operation detection unit is the predetermined user's operation.

6. The image forming apparatus according to claim 1, further comprising:
an image forming unit that forms an image on a recording sheet; and
an image formation control unit that controls an operation of the image forming unit,
wherein the image formation control unit causes the image forming unit to form an image that has undergone the perspective processing.

* * * * *